United States Patent
Koshigaya

(10) Patent No.: US 8,462,364 B2
(45) Date of Patent: Jun. 11, 2013

(54) HOST COMPUTER RECONNECTION PRIORITY DUE TO ERROR OCCURRENCE

(75) Inventor: Motoki Koshigaya, Kawasaki (JP)

(73) Assignee: Canon Kabushiki Kaisha (JP)

( * ) Notice: Subject to any disclaimer, the term of this patent is extended or adjusted under 35 U.S.C. 154(b) by 664 days.

(21) Appl. No.: 12/718,455

(22) Filed: Mar. 5, 2010

(65) Prior Publication Data

US 2010/0225951 A1 Sep. 9, 2010

(30) Foreign Application Priority Data

Mar. 5, 2009 (JP) ................... 2009-051983

(51) Int. Cl.
*G06K 15/00* (2006.01)
*G06F 3/12* (2006.01)

(52) U.S. Cl.
USPC .......................................... 358/1.14; 358/1.15

(58) Field of Classification Search
USPC ............... 358/1.1, 1.9, 1.13, 1.14, 1.15, 1.18, 358/402, 426.09; 709/201, 203; 714/49, 100, 714/699; 340/242, 243
See application file for complete search history.

(56) References Cited

U.S. PATENT DOCUMENTS

| 7,254,739 | B2* | 8/2007 | McCain ......................... 714/4.4 |
| 2005/0044287 | A1* | 2/2005 | Nishizono et al. ............... 710/15 |
| 2006/0117106 | A1* | 6/2006 | Abdo et al. ..................... 709/227 |
| 2009/0077428 | A1* | 3/2009 | Johnson ......................... 714/49 |
| 2009/0222604 | A1* | 9/2009 | Morozumi ..................... 710/106 |

FOREIGN PATENT DOCUMENTS

| JP | 2005-044094 A | 2/2005 |
| JP | 2007-251851 A | 9/2007 |

OTHER PUBLICATIONS

JP OA issued Mar. 5, 2013 for corresponding JP 2009-051983.

* cited by examiner

*Primary Examiner* — Gabriel Garcia
(74) *Attorney, Agent, or Firm* — Rossi, Kimms & McDowell LLP

(57) ABSTRACT

An image processing apparatus which, when an error occurs during communication with a host computer, gives a higher priority to reconnection to the host computer connected at the time of occurrence of the error than to connection to another host computer. A CPU of the apparatus accepts processing requests from the host computers. When accepting a processing request from a host computer, the CPU causes the apparatus to connect to the host computer. If occurrence of an error is detected during communication with the host computer, the CPU controls the connection such that reconnection to the host computer connected at the time of occurrence of the error is given priority over connection to another host computer.

11 Claims, 17 Drawing Sheets

FIG.5A

| HOST ID LIST | |
|---|---|
| ① | HOST ID OF PC 10a |
| ② | HOST ID OF PC 10b |
| ③ | HOST ID OF PC 10c |
| ④ | |
| ⑤ | |

FIG.5B

| HOST ID LIST | |
|---|---|
| ① | HOST ID OF PC 10b |
| ② | HOST ID OF PC 10c |
| ③ | HOST ID OF PC 10a |
| ④ | |
| ⑤ | |

FIG.5C

| HOST ID LIST | |
|---|---|
| ① | HOST ID OF PC 10b |
| ② | HOST ID OF PC 10c |
| ③ | |
| ④ | |
| ⑤ | |

FIG.6A

| | PRIORITY HOST ID LIST |
|---|---|
| ① | HOST ID OF PC 10a |
| ② | |
| ③ | |
| ④ | |
| ⑤ | |

FIG.6B

| | PRIORITY HOST ID LIST |
|---|---|
| ① | |
| ② | |
| ③ | |
| ④ | |
| ⑤ | |

| HOST ID LIST | |
|---|---|
| ① | HOST ID OF PC 10a |
| ② | HOST ID OF PC 10b |
| ③ | HOST ID OF PC 10c |
| ④ | |
| ⑤ | |

| HOST ID LIST | |
|---|---|
| ① | HOST ID OF PC 10b |
| ② | HOST ID OF PC 10c |
| ③ | |
| ④ | |
| ⑤ | |

| HOST ID LIST | |
|---|---|
| ① | HOST ID OF PC 10c |
| ② | HOST ID OF PC 10b |
| ③ | |
| ④ | |
| ⑤ | |

FIG.9A

| PRIORITY HOST ID LIST | |
|---|---|
| ① | HOST ID OF PC 10c |
| ② | |
| ③ | |
| ④ | |
| ⑤ | |

FIG.9B

| PRIORITY HOST ID LIST | |
|---|---|
| ① | HOST ID OF PC 10c |
| ② | HOST ID OF PC 10a |
| ③ | |
| ④ | |
| ⑤ | |

FIG.9C

| PRIORITY HOST ID LIST | |
|---|---|
| ① | HOST ID OF PC 10a |
| ② | |
| ③ | |
| ④ | |
| ⑤ | |

FIG.9D

| PRIORITY HOST ID LIST | |
|---|---|
| ① | |
| ② | |
| ③ | |
| ④ | |
| ⑤ | |

FIG.11A

| HOST ID LIST | |
|---|---|
| ① | HOST ID OF PC 10b |
| ② | HOST ID OF PC 10c |
| ③ | |
| ④ | |
| ⑤ | |

FIG.11B

| HOST ID LIST | |
|---|---|
| ① | HOST ID OF PC 10b |
| ② | HOST ID OF PC 10c |
| ③ | HOST ID OF PC 10a |
| ④ | |
| ⑤ | |

FIG.11C

| HOST ID LIST | |
|---|---|
| ① | HOST ID OF PC 10a |
| ② | HOST ID OF PC 10b |
| ③ | HOST ID OF PC 10c |
| ④ | |
| ⑤ | |

FIG.12A

| PRIORITY HOST ID LIST | |
|---|---|
| ① | HOST ID OF PC 10c |
| ② | HOST ID OF PC 10a |
| ③ | |
| ④ | |
| ⑤ | |

FIG.12B

| PRIORITY HOST ID LIST | |
|---|---|
| ① | HOST ID OF PC 10a |
| ② | |
| ③ | |
| ④ | |
| ⑤ | |

FIG.12C

| PRIORITY HOST ID LIST | |
|---|---|
| ① | HOST ID OF PC 10a |
| ② | HOST ID OF PC 10c |
| ③ | |
| ④ | |
| ⑤ | |

| PRIORITY HOST ID LIST | |
|---|---|
| ① | HOST ID OF PC 10c |
| ② | |
| ③ | |
| ④ | |
| ⑤ | |

FIG.12E

| PRIORITY HOST ID LIST | |
|---|---|
| ① | |
| ② | |
| ③ | |
| ④ | |
| ⑤ | |

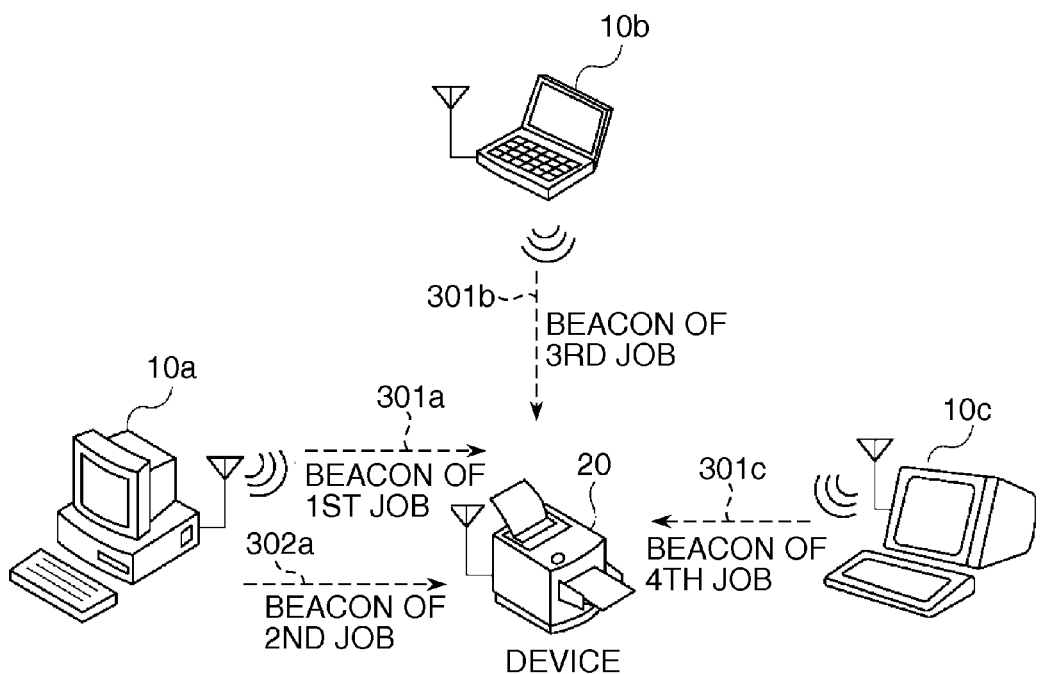

HOST COMPUTER RECONNECTION PRIORITY DUE TO ERROR OCCURRENCE

BACKGROUND OF THE INVENTION

1. Field of the Invention

The present invention relates to an image processing apparatus capable of communicating with a plurality of host computers, and a method of controlling the image processing apparatus.

2. Description of the Related Art

Conventionally, there has been proposed a wireless USB formed by making USB wireless which is one of standards used in a personal computer (PC) environment as an interface for connection to peripheral devices.

In wireless USB communication, simultaneous communication cannot be made between a plurality of host apparatuses (e.g. PCs) and a single printer, but communication is made only between a single host apparatus and a single printer. This is stipulated in a wireless USB specification (Wireless USB Specification Rev. 1.0).

A description will be given of an outline of connection establishment performed between a host apparatus (e.g. PC) and a device (image forming apparatus such as a printer) for one-to-one wireless USB communication, with reference to FIG. 13.

FIG. 13 is a diagram useful in explaining an example of a system for performing wireless USB communication between a host apparatus 10 having a wireless USB antenna 101 and a device 20 having a wireless USB antenna 102.

When the host apparatus 10 creates a print job by an application and desires to transmit a print request to the device 20, the host apparatus 10 first transmits a beacon. In the beacon, as shown in FIG. 14, a host ID 201 unique to the host apparatus 10 and a device ID 202 unique to the device 20 are described.

The device 20, which has received the beacon of this print request, starts a one-to-one connection process for establishing communication. First, the device 20 checks whether or not the device ID 202 in the beacon received from the host apparatus 10 is identical to the device ID of its own, and if the device IDs differ, discards the beacon.

If the device ID 202 in the beacon received from the host apparatus 10 is identical to the device ID of its own, the device 20 checks whether or not the host ID 201 in the beacon is identical to one of host IDs which are registered in the device 20 by association. Then, if the host ID 201 in the beacon is an unregistered host ID, the device 20 determines that the host apparatus 10 is a host apparatus with which association of the device 20 is not set yet, and discards the beacon.

It should be noted that the term "association" refers to a relationship between a host apparatus and a device in which a CC (Connection Context) composed of a host ID, a device ID, and a connection Key is shared between the host apparatus and the device, and the relationship is set by an initial connection process required to be performed only once when installing a wireless USB device.

Next, if the host ID 201 in the beacon is a registered host ID, the device 20 transmits a connection request to the host apparatus 10. It should be noted that it is impossible to transmit a connection request from a host apparatus side to a device side due to the wireless USB specification.

When the host apparatus 10 permits connection requested by the device 20, the host apparatus 10 transmits spooled print data to the device 20. Upon completion of the transmission of the print data, the host apparatus 10 transmits a disconnection request to avoid occupying the device 20. This disconnection request can be transmitted from either of the host and the device.

As described above, the connection establishment for one-to-one wireless USB communication is performed. However, in the case of an environment where a plurality of host apparatuses share a single device, there occurs the following problem:

When the device receives a print request via a beacon from a host apparatus, the device is occupied by the host apparatus and unable to receive a print request from other host apparatuses during reception of the print data, so that there is a possibility that a print job to be processed next is not necessarily be executed in order.

As a solution to such problem, there has been proposed a system where host information is listed in a device based on beacons received from a plurality of host apparatuses and connection requests are transmitted to the host apparatuses in the listed order (Japanese Patent Laid-Open Publication No. 2007-251851).

A description will be given with reference to FIGS. 15 to 17. FIG. 15 shows host PCs 10a to 10c and a device 20. The host PC 10a transmits beacons 301a and 302a to the device 20, the host PC 10b transmits a beacon 301b to the device 20, and the host PC 10c transmits a beacon 301c to the device 20.

When viewed from the device 20, the beacon 301a is for a first job, the beacon 302a is for a second job, the beacon 301b is for a third job, and the beacon 301c is for a fourth job.

A host ID list 401 shown in FIG. 16 is a list of host PCs stored in an internal memory of the device 20 and is comprised of a number column 402 and a host name column 403.

Upon receipt of each beacon, the device 20 registers host information in the host ID list 401 in the order of receipt. The number column 402 of the host ID list 401 indicates an order in which the beacons were received from the host PCs, and at the same time, an order in which connection requests are to be transmitted to the host PCs.

FIG. 17 is a flowchart showing a process performed by the device 20 following the order of the host ID list 401.

In FIG. 17, a part of the process for the first job includes sending a connection request to the host PC 10a (501), receiving print data reception from the host PC 10a (502), and sending a disconnection request to the host PC 10a (503). A part of the process for the second job (504 to 506), a part of the process for the third job (507 to 509), and a part of the process for the fourth job (510 to 512) are performed in a similar manner to the part of the process for the first job.

In an environment where a plurality of host PCs share a single device, such a wireless USB communication system makes it possible for the device to process print jobs in an order following the order of print requests from the plurality of host PCs.

In the wireless USB communication, simultaneous communication cannot be made between a plurality of host PCs and a single device, and wireless communication is made only between a single host PC and a single device.

Therefore, for example, when wireless communication is performed between a host PC and a device, if an error occurs due to e.g. disconnection of the communication caused by an obstacle, there is a possibility that the host PC cannot immediately reconnect to the device even though attempting to do so. In other words, if another host PC that transmitted a beacon during the disconnection has been connected to the device, reconnection to the host PC from which the communication was disconnected cannot be performed until the communication between the newly-connected host PC and the device is terminated.

SUMMARY OF THE INVENTION

The present invention provides an image processing apparatus which, when an error occurs during communication with a host computer, gives a higher priority to reconnection to the host computer connected at the time of occurrence of the error than to connection to another host computer.

In a first aspect of the present invention, there is provided an image processing apparatus capable of communicating with a plurality of host computers, comprising an accepting unit configured to accept processing requests from the plurality of host computers, a connecting unit configured to be operable when the accepting unit accepts a processing request from any of the plurality of host computers, to connect to a host computer which is a transmission source of the accepted processing request, a detecting unit configured to detect occurrence of an error during communication with the host computer connected by the connecting unit, and a control unit configured to be operable when the detecting unit detects occurrence of an error, to control the connecting unit such that reconnection to the host computer connected at the time of occurrence of the error is given priority over connection to another host computer.

In a second aspect of the present invention, there is provided a method of controlling an image processing apparatus capable of communicating with a plurality of host computers, comprising accepting processing requests from the plurality of host computers, connecting, when the accepting accepts a processing request from any of the plurality of host computers, to a host computer which is a transmission source of the accepted processing request, detecting occurrence of an error during communication with the host computer connected by the connecting unit, and controlling the connecting, when the detecting detects occurrence of an error, such that reconnection to the host computer connected at the time of occurrence of the error is given priority over connection to another host computer.

In a third aspect of the present invention, there is provided a computer-readable storage medium which stores a program for causing a computer to execute a method of controlling an image processing apparatus capable of communicating with a plurality of host computers, wherein the method comprises accepting processing requests from the plurality of host computers, connecting, when the accepting accepts a processing request from any of the plurality of host computers, to a host computer which is a transmission source of the accepted processing request, detecting occurrence of an error during communication with the host computer connected by the connecting unit, and controlling the connecting, when the detecting detects occurrence of an error, such that reconnection to the host computer connected at the time of occurrence of the error is given priority over connection to another host computer.

According to the present invention, when an error occurs during communication with a host computer, it is possible to give a higher priority to reconnection to the host computer connected at the time of occurrence of the error than to connection to another host computer.

Further features of the present invention will become apparent from the following description of exemplary embodiments (with reference to the attached drawings).

BRIEF DESCRIPTION OF THE DRAWINGS

FIGS. 5A to 5C are diagrams each showing an example of a host ID list.

FIGS. 6A and 6B are diagrams each showing an example of a priority host ID list.

FIGS. 9A to 9D are diagrams each showing an example of the priority host ID list.

FIGS. 11A to 11C are diagrams each showing an example of the host ID list.

FIGS. 12A to 12E are diagrams each showing an example of the priority host ID list.

FIG. 15 is a perspective view useful in explaining an outline of beacon reception in a system constructed by a plurality of host apparatuses and a single device.

FIG. 16 is a diagram showing an example of the host ID list stored in a device.

DETAILED DESCRIPTION OF THE EMBODIMENTS

The present invention will now be described in detail below with reference to the accompanying drawings showing embodiments thereof.

Figure 1:
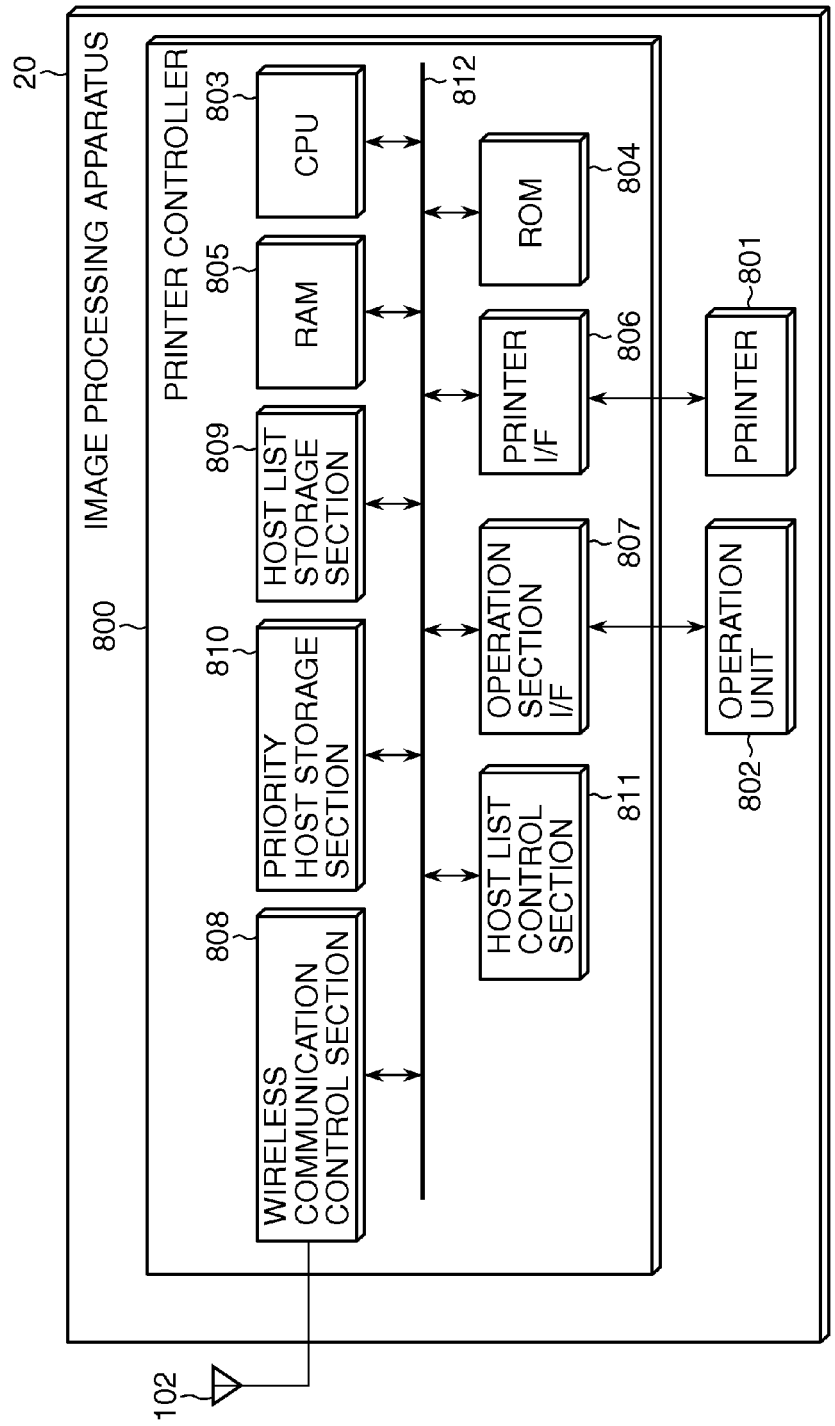
FIG. 1 is a block diagram of an image processing apparatus according to a first embodiment of the present invention.

FIG. 1 is a block diagram of an image processing apparatus according to a first embodiment of the present invention.

Figure 2:
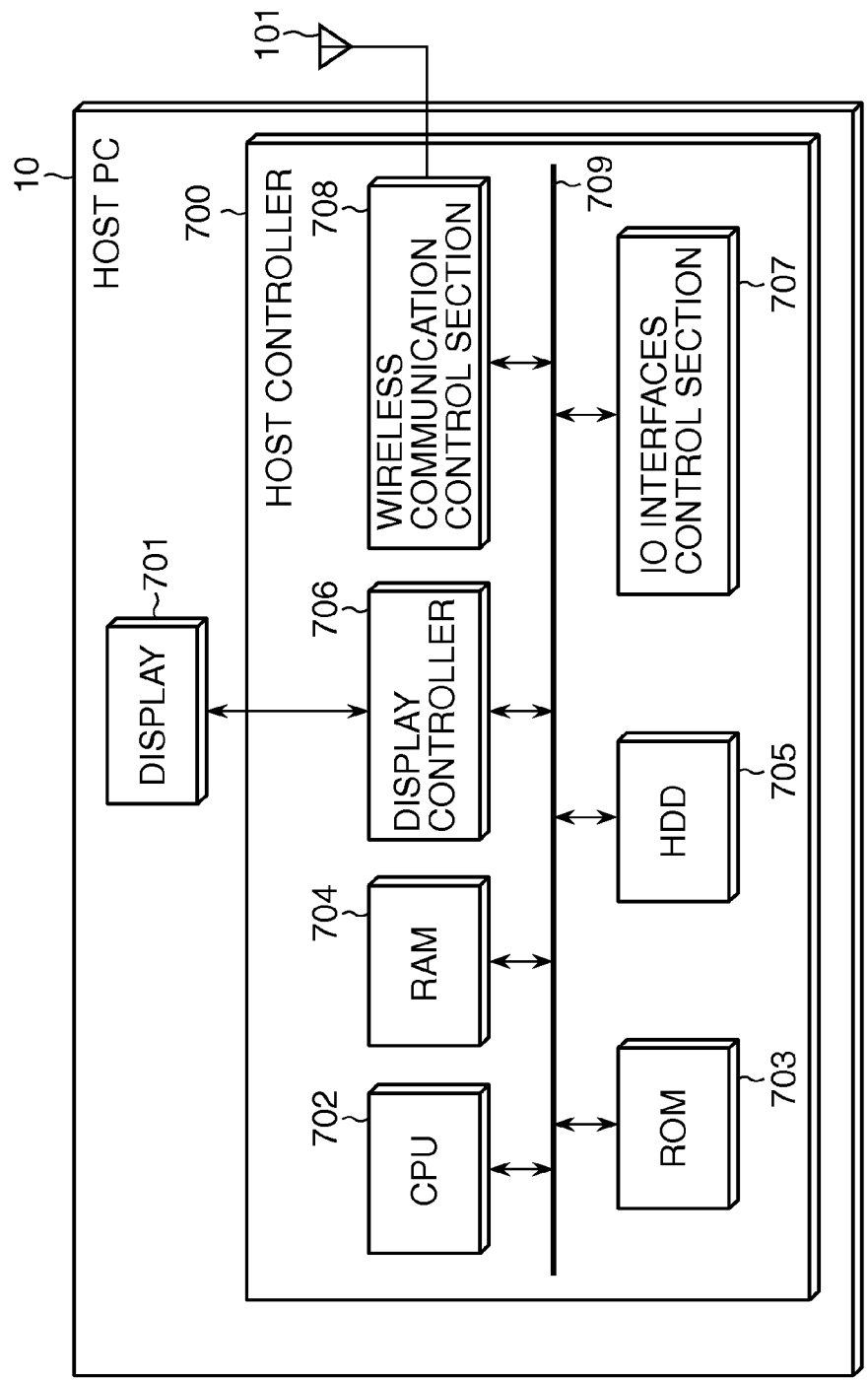
FIG. 2 is a block diagram of a host PC.

As shown in FIG. 1, an image processing apparatus 20 of the present embodiment has a printer 801 and an operation unit 802 connected to a printer controller 800 thereof, and is capable of performing wireless USB communication with a host PC (host computer) 10 shown in FIG. 2.

The printer controller 800 comprises a CPU 803, a ROM 804, a RAM 805, a printer interface 806, an operation section interface 807, a wireless communication control section 808, a host list storage section 809, a priority host storage section 810, and a host list control section 811. These elements 803 to 811 are disposed on a system bus 812.

The CPU 803 controls the overall system. The ROM 804 is a boot ROM and stores a boot program of the system. The RAM 805 serves as a system work memory for operating the CPU 803 and also serves as an image memory for temporarily storing image data, such as print data, transmitted from the host PC 10.

The printer interface 806 is connected to the printer 801 and communicates with a CPU of the printer 801. The printer interface 806 also performs synchronous/asynchronous conversion of image data. The operation section interface 807 provides interface with the operation unit 802 and outputs image data to be displayed on the operation unit 802 thereto.

The operation section interface 807 also outputs operation information input by a user from the operation unit 802 to the CPU 803.

The wireless communication control section 808 performs control of wireless USB communication via a wireless USB antenna 102 when a host PC externally exists which performs wireless USB communication. The wireless communication control section 808 receives a beacon of a print request transmitted from the host PC 10, via the wireless USB antenna 102.

The host list storage section 809 is a memory for storing and listing host IDs. More specifically, the host list storage section 809 registers a host ID included in each beacon from the host PC 10 received by the wireless communication control section 808 in the order of receipt, and enters the same in a host ID list.

When a connection process is performed in response to the beacon transmitted from the host PC 10, and a job is processed between the host PC 10 to which the connection is established and the image processing apparatus 20, the priority host storage section 810 registers the host ID of the connected host PC 10 and enters the same in a priority host ID list. Both the host ID list and the priority host ID lists stored in the host list storage section 809 and the priority host ID list storage section 810, respectively, are formed such that a host ID earlier in the order of entry in the associated list is given a higher priority.

The host list control section 811 identifies the priority host ID list stored in the priority host storage section 810 and updates the priority host ID list whenever each job processing is started and terminated. The host list control section 811 also identifies the host ID list stored in the host list storage section 809 and performs control of managing the order of receipt of beacons of print requests.

Next, a description will be given of a configuration of the host PC 10 with reference to FIG. 2.

As shown in FIG. 2, the host PC 10 has a display 701 and input devices, not shown, such as a keyboard and a mouse, connected to a host controller 700.

The host controller 700 has a CPU 702, a ROM 703, a RAM 704, an HDD 705, a display controller 706, IO interfaces control section 707, and a wireless communication control section 708 disposed on a system bus 709.

The CPU 702 controls the overall system. The ROM 703 is a boot ROM and stores a boot program of the system. The RAM 704 servers as a system work memory for operating the CPU 702 and also serves as an image memory for temporarily storing image data, such as print data. The HDD 705 stores system software, image data, and the like.

The display controller 706 outputs image data to be displayed on the display 701 to the display 701. The IO interfaces control section 707 controls input/output interfaces, not shown, such as a keyboard and a mouse, and controls e.g. a wired USB. Further, the IO interfaces control section 707 also controls e.g. communication network, such as a widespread LAN. The wireless communication control section 708 performs control of wireless USB communication via a wireless USB antenna 101 when an image forming apparatus externally exists which performs wireless USB communication.

Figure 3:
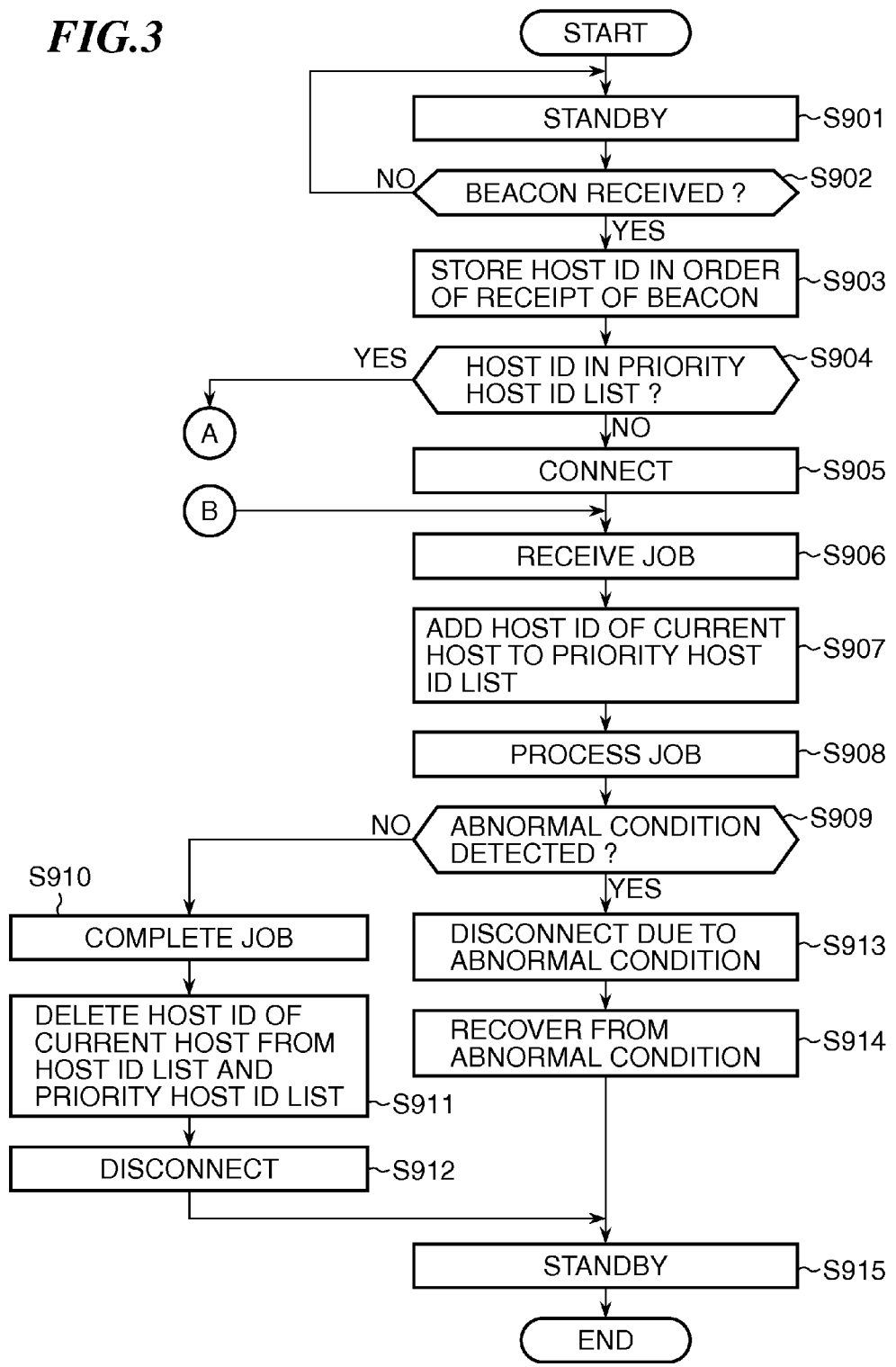
FIG. 3 is a flowchart of a job receiving and executing process performed by the image processing apparatus.
Figure 4:
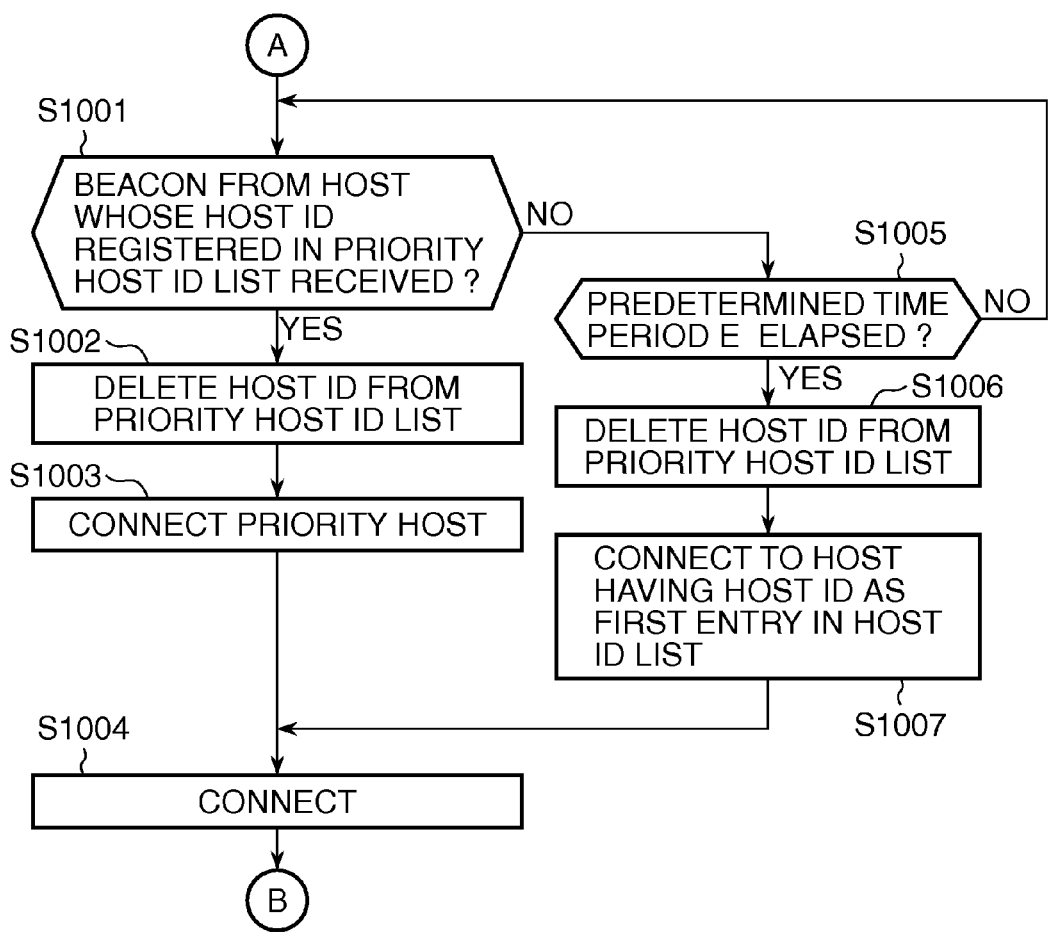
FIG. 4 is a continuation of FIG. 3.

Next, a description will be given of an example of a job receiving and executing process performed by the image processing apparatus 20 according to the present embodiment with reference to FIGS. 3 and 4. The job receiving and executing process shown in FIGS. 3 and 4 is executed by the CPU 803 by loading a program stored in e.g. the ROM 804 of the image processing apparatus 20 into the RAM 805. It should be noted that in the following, a description will be given of a case, by way of example, where a system is constructed by the three host PCs 10a to 10c and the single image processing apparatus 20, already described with reference to FIG. 15, and the image processing apparatus 20 creates a host ID list 401 shown in FIG. 16 to store the same in the host list storage section 809.

In a step S901, the CPU 803 maintains a standby state, and proceeds to a step S902.

In the step S902, the CPU 803 determines whether a beacon of a print request is received via the wireless USB antenna 102 and the wireless communication control section 808. This step 902 is one example of an accepting unit in the present invention, and the print request corresponds to one example of a processing request from a plurality of host PCs.

Then, if a beacon of a print request is received, the CPU 803 proceeds to a step S903.

Normally, upon receipt of a print request from a host PC as a transmission source, a connection process with the host PC starts, but in the illustrated example, no connection request is sent as a response to the host PC for a predetermined time period.

For example, even if beacons of print requests are transmitted from the host PC 10a, the host PC 10b, and the host PC 10c in the mentioned order, no connection request is sent as a response to any of the host PCs for the predetermined time period. This predetermined time period is a desired time period which is adjustable.

While the image processing apparatus 20 does not receive a beacon from the host PCs, the image processing apparatus 20 is always on standby, and can also enter a power-saving mode such as a sleep mode, depending on functions equipped in the image processing apparatus 20.

In the step S903, the CPU 803 controls the host list control section 811 to register a host ID included in a beacon received from each host PC in the order of receipt in the host list storage section 809, and proceeds to a step S904. FIG. 5A is a diagram showing one example of a host ID list registered in the host list storage section 809.

In the step S904, the CPU 803 controls the host list control section 811 to determine whether or not a priority host ID list in which a host ID is registered in a step S907, referred to hereinafter, is stored in the priority host storage section 810.

Then, if the priority host ID list in which a host ID is registered in the step S907 is stored in the priority host storage section 810, the CPU 803 proceeds to a step S1001 appearing in FIG. 4, whereas if the priority host ID list is not stored, the CPU 803 proceeds to a step S905.

In the step S905, the CPU 803 starts a one-to-one connection process for establishing communication with a host PC from which the beacon is first received, and sends back a connection request thereto as a response via the wireless communication control section 808 and the wireless USB antenna 102. According to the host ID list shown in FIG. 5A, the CPU 803 responds to the print request from the host PC 10a. By doing so, the host PC 10a and the image processing apparatus 20 perform the one-to-one connection process of wireless USB connection to establish communication therebetween, and the CPU 803 proceeds to a step S906.

In the step S906, the CPU 803 receives print data from the host PC 10 to which the connection has been established via the wireless USB antenna 101 and the wireless communication control section 808, and then proceeds to the step S907.

In the step S907, the CPU 803 controls the host list control section 811 to register the host ID of the host PC 10 from which the print data is received in the priority host ID list in the priority host storage section 810 and proceeds to a step S908. Here, in the present example, as shown in FIG. 6A, the host ID of the host PC 10*a* is registered in the priority host ID list in the priority host storage section 810.

In the step S908, the CPU 803 performs predetermined processing on the received print data by e.g. an image processing section, not shown, outputs the processed print data to the printer 801 through the printer interface 806, and proceeds to a step S909.

In the step S909, the CPU 803 determines whether or not an abnormal condition for disconnecting the communication, such as a printer error and an obstacle to wireless communication, is detected, and proceeds to a step S913 if the abnormal condition is disconnected (i.e. if occurrence of an error is detected), or to a step S910 if the abnormal condition is not disconnected.

In the step S910, the CPU 803 waits until the job transmitted from the host PC 10 is completed, and then proceeds to a step S911.

In the step S911, the CPU 803 controls the host list control section 811 to update the host ID list in the host list storage section 809 and the priority host ID list in the priority host storage section 810, and proceeds to a step S912. In the present example, the host ID of the currently connected host PC 10*a* is deleted from the host ID list and the priority host ID list (see FIG. 6B).

In the step S912, the CPU 803 performs processing for disconnecting the communication by wireless USB connection between the image processing apparatus 20 and the host PC 10, and proceeds to a step S915. Here, a request for disconnecting the communication can be transmitted from either of the host PC 10 and the image processing apparatus 20.

In the step S915, the CPU 803 enters the standby state. At this stage, in the present example, the entries of the host PC 10*b* and the host PC 10*c* remain in the host list ID list in the host list storage section 809, and therefore in accordance with the host ID list, the CPU 803 responds to each of the print requests associated with the host PCs, by a connection request, sequentially to perform job processing.

On the other hand, in the step S913, the CPU 803 performs processing for disconnecting the communication. Then, in a step S914, CPU 803 waits until the abnormal condition is cleared. and upon recovery from the abnormal condition, proceeds to the step S915 to enter the standby state.

In this case, the job is not completed normally, hence the step S911 is not executed in which the host ID of the host PC 10*a* is deleted from the priority host ID list stored in the priority host storage section 810. Therefore, in this case, the priority host ID list stored in the priority host storage section 810 remains to hold the entry of the host ID of the host PC 10*a* having been connected until the step S909 (see FIG. 6A). It should be noted that since the abnormal condition may be an error that necessitates restart of power supply for recovery, the priority host storage section 810 needs to be implemented by a nonvolatile memory or an HDD.

Next, a description will be given of a process from the step S1001 onward in a case where it is determined in the step S904 that the priority host ID list in which a host ID is registered is stored in the priority host storage section 810, with reference to FIG. 4. Incidentally, if a beacon of a print request is once again received from the host PC 10*a* in the step S902, the host ID list in the host list storage section 809 is updated to contain the entries of the host PC 10*b*, the host PC 10*c*, and the host PC 10*a* in the mentioned order (see FIG. 5B).

In the step S1001, the CPU 803 controls the host list control section 811 to determine whether or not there is a print request from a host PC having a host ID registered in the priority host ID list. This processing is performed over a predetermined time period. More specifically, under the control of the CPU 803, the host list control section 811 compares host IDs registered in the host ID list in the step S903 with priority host IDs registered in the priority host ID list in the priority host storage section 810. In the illustrated example, the host ID list shown in FIG. 5B and the priority host ID list shown in FIG. 6A are compared with each other, and as a result, it is determined that there is a print request from a host PC having a host ID registered in the priority host ID list (YES to S1001), and hence the CPU 803 proceeds to a step S1002. On the other hand, if there is no print request from a host PC having a host ID registered in the priority host ID list (NO to S1001), the CPU 803 proceeds to a step S1005.

In the step S1002, the CPU 803 controls the host list control section 811 to delete the entry of the host ID of the host PC registered in the priority host ID list stored in the priority host storage section 810 and proceeds to a step S1003. In the present example, the entry of the priority host ID of the host PC 10*a* is deleted from the priority host ID list stored in the priority host storage section 810, and as a result, the priority host ID list is changed as shown in FIG. 6B.

In the step S1003, the CPU 803 sends back a connection request as a response to the host PC having the priority host ID deleted just now from the priority host ID list, and proceeds to a step S1004. Normally, as for sending a connection request, a higher priority is given in the order of registration in the host ID list. In the present case, it is determined in the step S1001 that there is a host ID registered in the priority host ID (though deleted in the immediately preceding step S1002), the order of the host PCs to be responded to the print requests is changed.

In the step S1004, the CPU 803 performs the same process as in the step S905 appearing in FIG. 3, and proceeds to the step S906 appearing in FIG. 3 after the communication is established.

On the other hand, if a beacon of a print request is not received once again from the host PC 10*a* in the step S902 appearing in FIG. 3 within the predetermined time period, the host ID list in the host list storage section 809 is changed into a state shown in FIG. 5C.

In this case, in the step S1001, the CPU 803 determines that there is no print request from a host PC having a host ID registered in the priority host ID list, and hence proceeds to the step S1005.

In the step S1005, the CPU 803 determines whether or not a predetermined time period has elapsed, and proceeds to a step S1006 if the predetermined time period has elapsed.

In the step S1006, the CPU 803 controls the host list control section 811 to delete the host ID of the host PC 10*a* registered in the priority host ID list stored in the priority host storage section 810, and proceeds to a step S1007. Although this process in the step S1006 is executed to return the connection priority order to normal because a reconnection is not made by the host PC 10*a*, the step S1006 may be omitted depending on circumstances. If the step S1006 is omitted, when the host PC having the host ID left undeleted in the priority host ID list makes a job processing request next time, the priority host ID of the host PC is deleted from the priority host ID list in the priority host storage section 810.

In the step S1007, the CPU 803 sends back a connection request as a response to the host PC 10 having the host ID registered as a first entry in the host ID list, and in the step S1004, after the communication is established, the CPU 803 proceeds to the step S906 appearing in FIG. 3.

As described above, with the image processing apparatus 20 according to the present embodiment, during the wireless USB communication with the host PC 10, even if the communication is disconnected due to occurrence of an error, the reconnection to the host PC 10 is given priority after recovery from the error. This makes it possible to prevent interruption by other host PCs.

Next, a description will be given of an image processing apparatus according to a second embodiment of the present invention, with reference to FIGS. 7A to 9D. Component parts and elements corresponding to those of the first embodiment are denoted by the same reference numerals, and detailed description thereof is omitted.

Figure 7A:
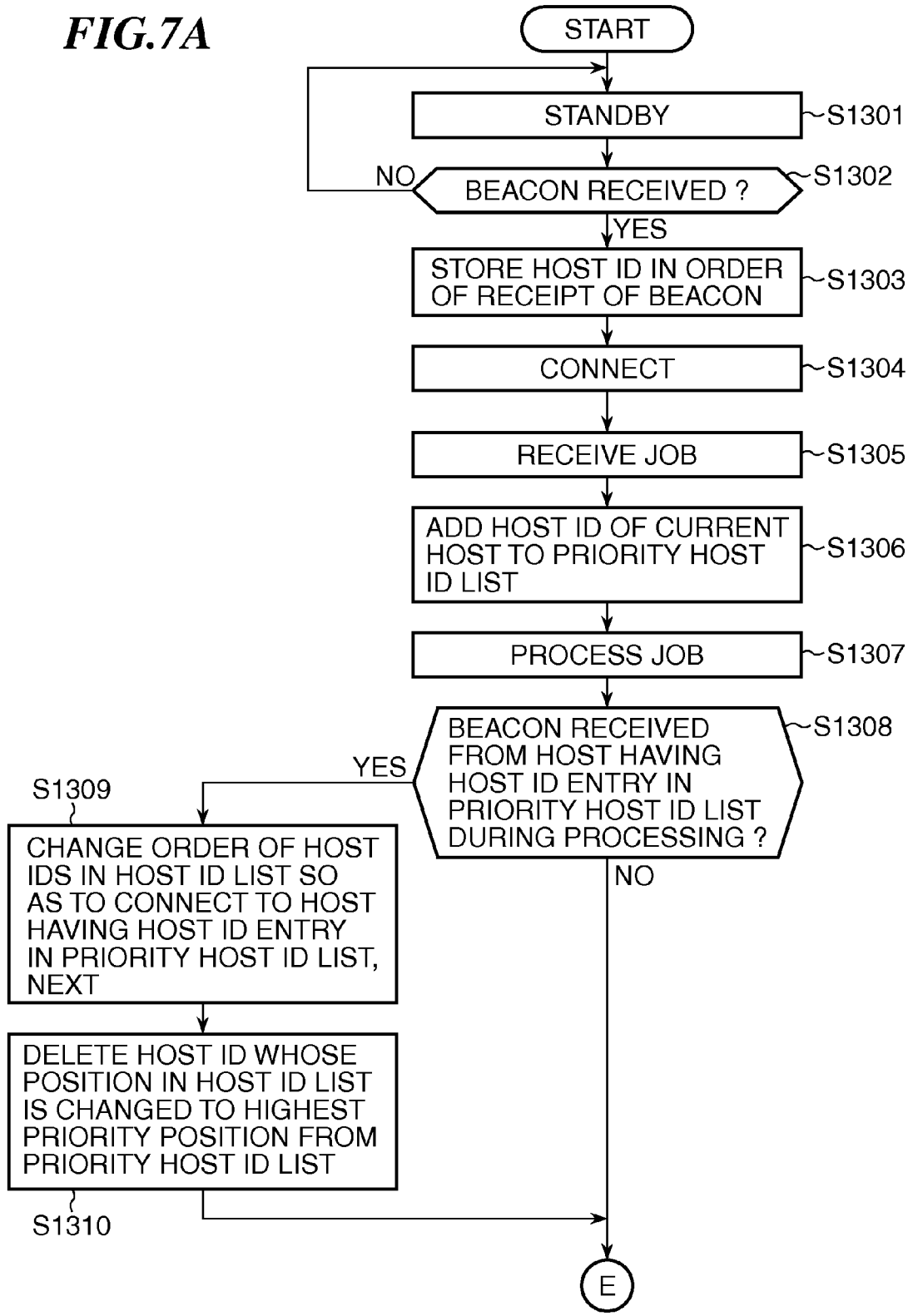
FIGS. 7A and 7B are a flowchart of a job receiving and executing process performed by an image processing apparatus according to a second embodiment of the present invention.
Figure 7B:
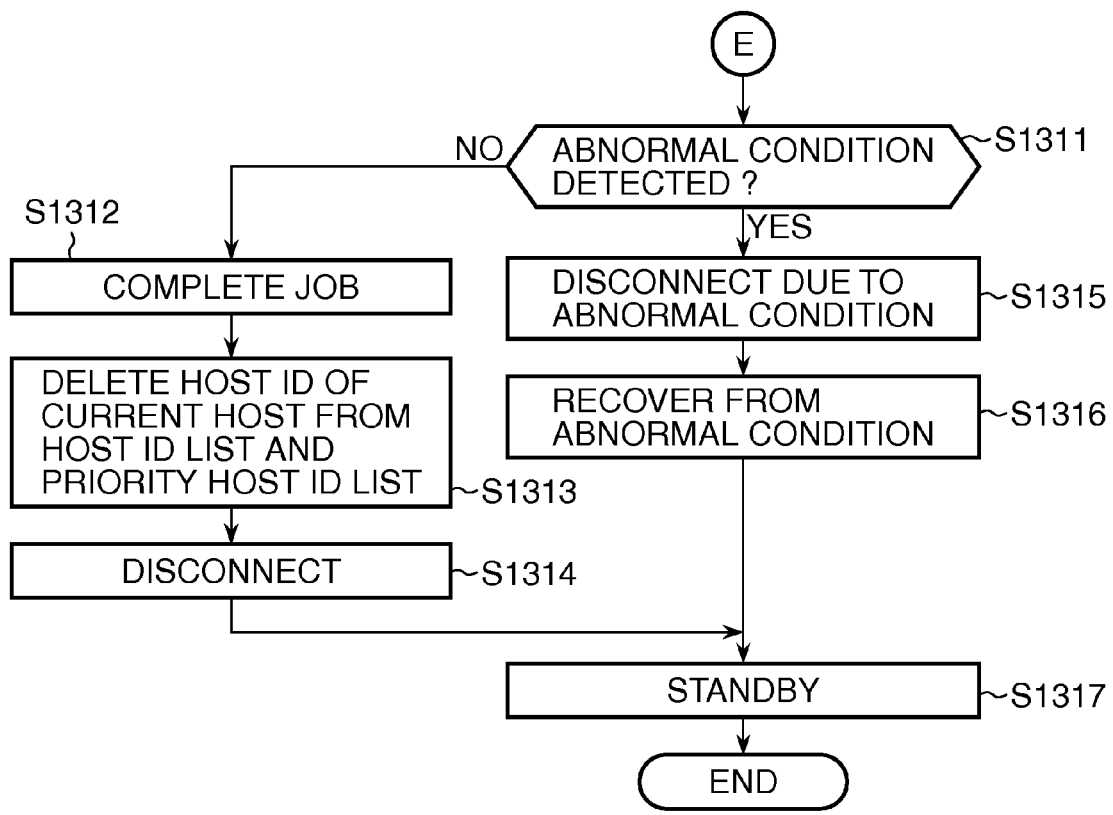

FIGS. 7A and 7B are a flowchart of a job receiving and executing process performed by the image processing apparatus 20 according to the present embodiment. The job receiving and executing process shown in FIGS. 7A and 7B is executed by the CPU 803 by loading a program stored in e.g. the ROM 804 of the image processing apparatus 20 into the RAM 805. It should be noted that in the following, a description will be given of a case, by way of example, where the host ID of the host PC 10c is registered in the priority host ID list in the priority host storage section 810 (see FIG. 9A).

In a step S1301, the CPU 803 maintains standby, and proceeds to a step S1302.

In the step S1302, the CPU 803 determines whether a beacon of a print request is received via the wireless USB antenna 102 and the wireless communication control section 808.

Then, if a beacon of a print request is received, the CPU 803 proceeds to a step S1303.

Figures 8A, 8B, 8C:
FIGS. 8A to 8C are diagrams each showing an example of the host ID list.

In the step S1303, the CPU 803 controls the host list control section 811 to register the host ID included in each beacon received from the host PCs in the order of receipt in a host ID list the host list storage section 809, and proceeds to a step S1304. FIG. 8A is a diagram showing one example of the host ID list stored in the host list storage section 809.

In the step S1304, the CPU 803 starts the one-to-one connection process for establishing communication with a host PC from which the beacon is first received, and sends back a connection request as a response via the wireless communication control section 808 and the wireless USB antenna 102. According to a host ID list shown in FIG. 8A, the CPU 803 responds to the print request from the host PC 10a. By doing so, the host PC 10a and the image processing apparatus 20 perform the one-to-one connection process of wireless USB connection to establish communication therebetween, and the CPU 803 proceeds to a step S1305. Incidentally, when a beacon of a print request to the image processing apparatus 20 is received from a host PC after the communication is established, the host ID list in the host list storage section 809 is updated by the host list control section 811.

In the step S1305, the CPU 803 receives print data from the host PC 10 with which the connection is established via the wireless USB antenna 101 and the wireless communication control section 808, and proceeds to a step S1306.

In the step S1306, the CPU 803 controls the host list control section 811 to register the host ID of the host PC 10 from which the print data is received in a priority host ID list in the priority host storage section 810, and proceeds to a step S1307. Here, in the present example, the host ID of the host PC 10a is additionally registered after the host ID of the host PC 10c that was registered earlier in the priority host ID list in the priority host storage section 810, shown in FIG. 9A, and as a result, the priority host ID list is changed as shown in FIG. 9B.

In the step S1307, the CPU 803 performs predetermined processing on the received print data by e.g. the image processing section, not shown, outputs the processed print data to the printer 801 through the printer interface 806, and then proceeds to a step S1308.

In the step S1308, the CPU 803 controls the host list control section 811 to determine whether or not there has been a print request from a host PC having a host ID registered in the priority host ID list during the job processing.

Here, under the control of the CPU 803, the host list control section 811 compares the host IDs registered in the host ID list with the host IDs registered in the priority host ID list in the priority host storage section 810.

In the present example, the host ID list shown in FIG. 8B and the priority host ID list shown in FIG. 9B are compared with each other, and it is determined as a result of the comparison that there is a print request from a host PC having a host ID registered in the priority host ID list, so that the CPU 803 proceeds to a step S1309. On the other hand, if there is no print request from a host PC having a host ID registered in the priority host ID list, the CPU 803 proceeds to a step S1311.

In the step S1309, the CPU 803 controls the host list control section 811 to change the order of the host IDs in the host ID list stored in the host list storage section 809, and proceeds to a step S1310.

Here, out of the host IDs registered in the host ID list in the host list storage section 809, a host ID that has matched in the comparison between the host ID list shown in FIG. 8B and the priority host ID list shown in FIG. 9B is moved to the highest priority position in the host ID list. In the present example, as shown in FIG. 8C, the host ID of the host PC 10c in the second position in priority order in the host ID list is moved to the first position, and the host ID of the host PC 10b is moved to the second position.

In the step S1310, the CPU 803 controls the host list control section 811 to delete the host ID whose position in the host ID list has been changed to the highest priority position in the step S1309 from the priority host ID list in the priority host storage section 810, and then proceeds to the step S1311. In the present example, the host ID of the host PC 10c is deleted from the priority host ID list, and the priority host ID list is changed as shown in FIG. 9C.

In the step S1311, the CPU 803 determines whether or not the communication is disconnected by an abnormal condition, such as a printer error and an obstacle to wireless communication, and proceeds to a step S1315 if the communication is disconnected (i.e. if occurrence of an error is detected), or to a step S1312 if the communication is not disconnected.

In the step S1312, the CPU 803 waits until the job transmitted from the host PC 10 is completed, and then proceeds to a step S1313.

In the step S1313, the CPU 803 controls the host list control section 811 to update the host list ID in the host list storage section 809 and the priority host ID list in the priority host storage section 810, and then proceeds to a step S1314. In the present example, the host ID of the currently connected host PC 10a is deleted from the host list ID and the priority host ID list (see FIG. 9D).

In the step S1314, the CPU 803 performs the processing for disconnecting the communication by wireless USB connection between the image processing apparatus 20 and the host PC 10, and then proceeds to a step S1317. In the present example, the request for disconnecting the communication can be transmitted from either of the host PC 10 side and the image processing apparatus 20 side.

In the step S1317, the CPU 803 enters the standby state. At this stage, in the present example, the entries of the host PC 10c and the host PC 10b remain in the host ID list in the host list storage section 809, and therefore in accordance with the host ID list, the CPU 803 responds to each of the print requests associated with the respective host PCs, by a connection request, sequentially to perform job processing. In this case, since the order of the host IDs in the host ID list has been changed in the step S1309, the host PC 10c is connected prior to the host PC 10b.

On the other hand, in the step S1315, the CPU 803 waits until the abnormal condition is cleared. In a step S1316, upon recovery from the abnormal condition, the CPU 803 proceeds to the step S1317 to enter the standby state.

At this time, the job is not completed normally, hence the process for deleting the host ID of the currently connected host PC 10a from the priority host ID list is not performed as in the step S1313. Therefore, in this case, the priority host ID of the host PC 10a having been connected until the step S1311 remains to be held in the priority host ID list (see FIG. 9C).

Next, a description will be given of an image processing apparatus according to a third embodiment of the present invention with reference to FIGS. 10A to 12E. Component parts and elements corresponding to those of the first and second embodiments are denoted by the same reference numerals, and detailed description thereof is omitted.

Figure 10A:
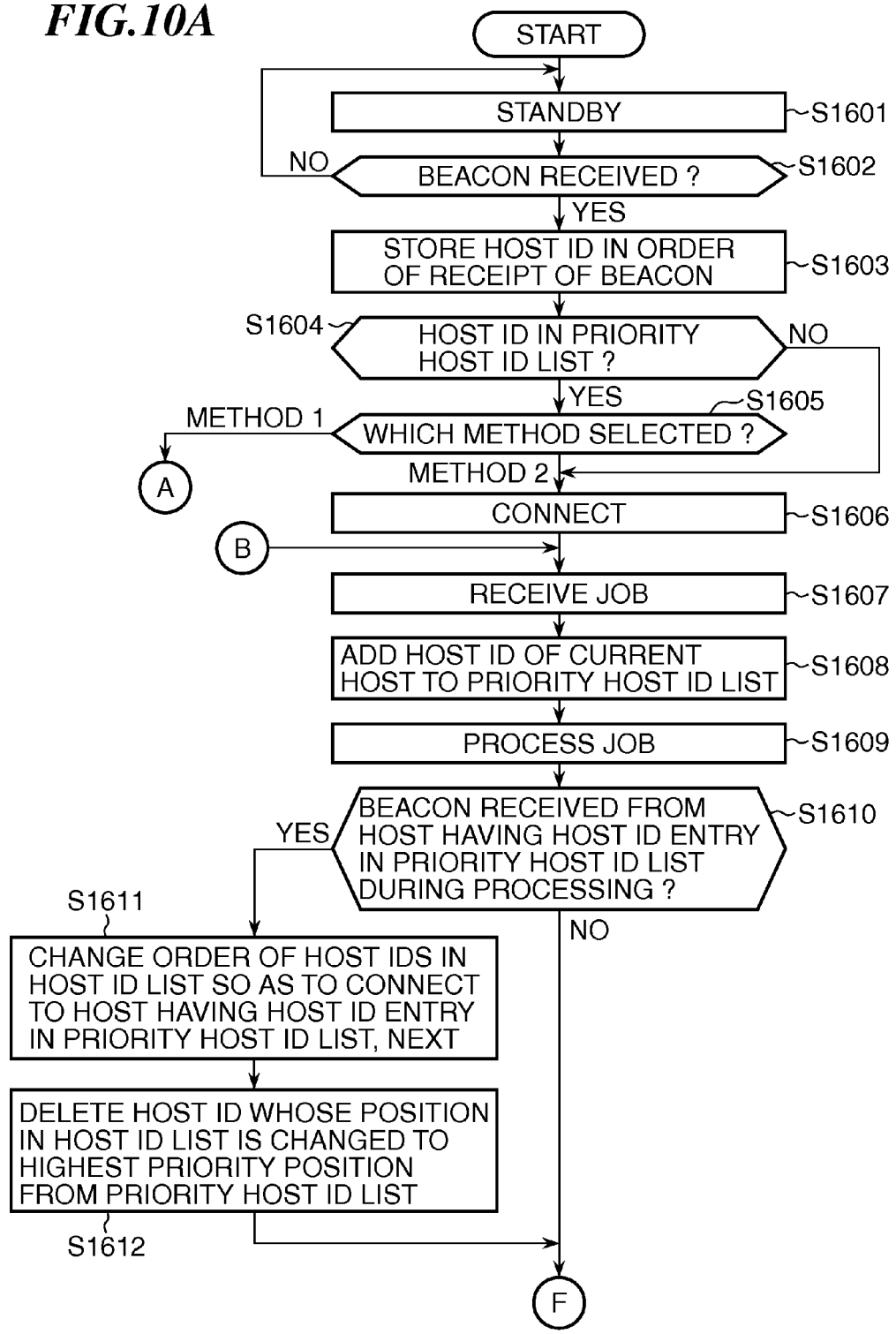
FIGS. 10A and 10B are a flowchart of a job receiving and executing process performed by an image processing apparatus according to a third embodiment of the present invention.
Figure 10B:
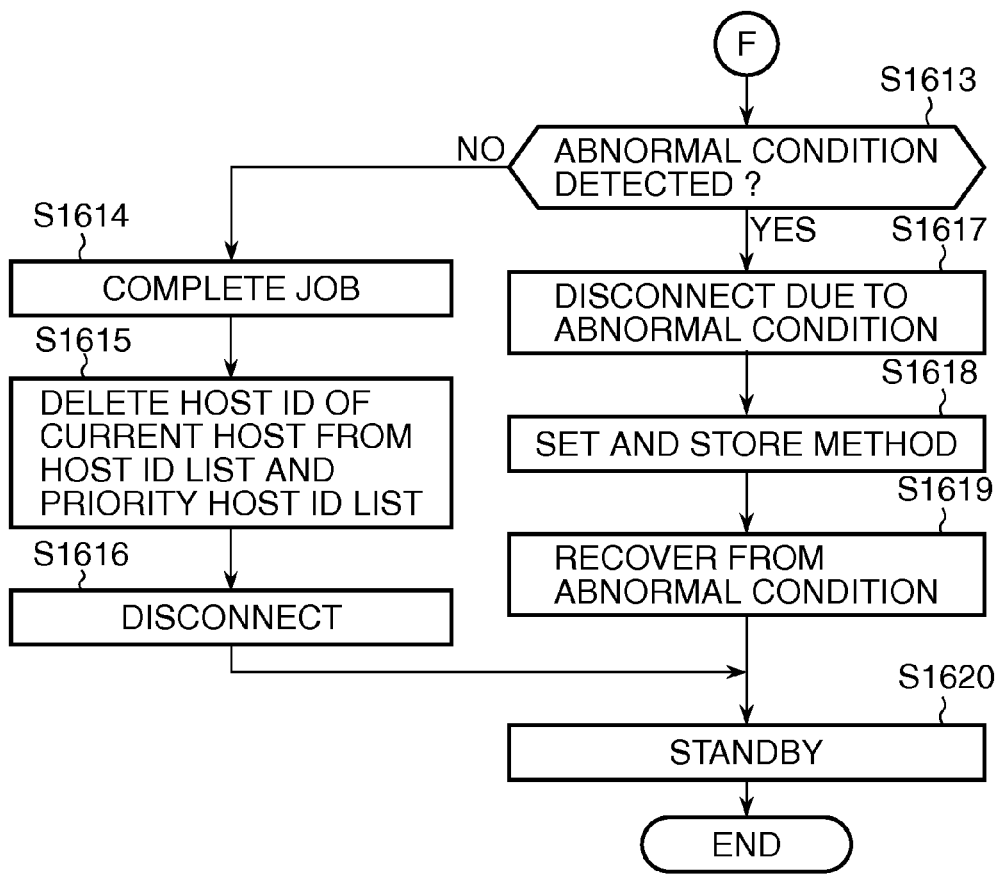
Figure 13:
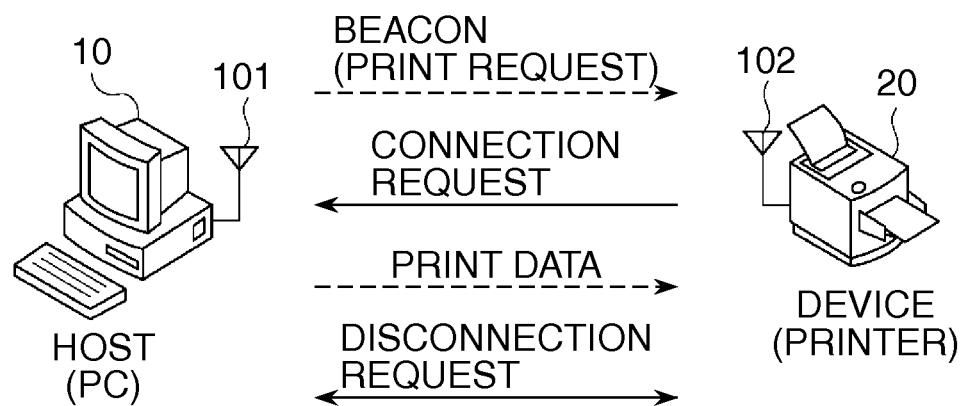
FIG. 13 is a perspective view useful in explaining an outline of connection establishment for one-to-one wireless USB communication between a host apparatus and a device.
Figure 14:
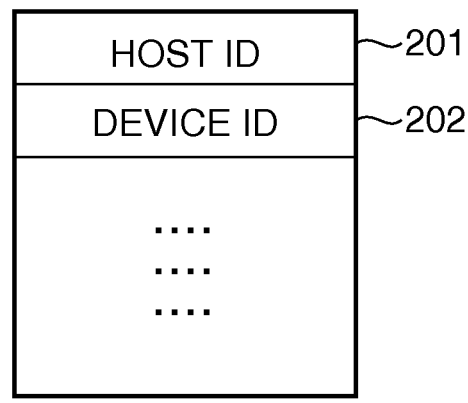
FIG. 14 is a diagram useful in explaining contents of a beacon, including a host ID and a device ID.
Figure 17:
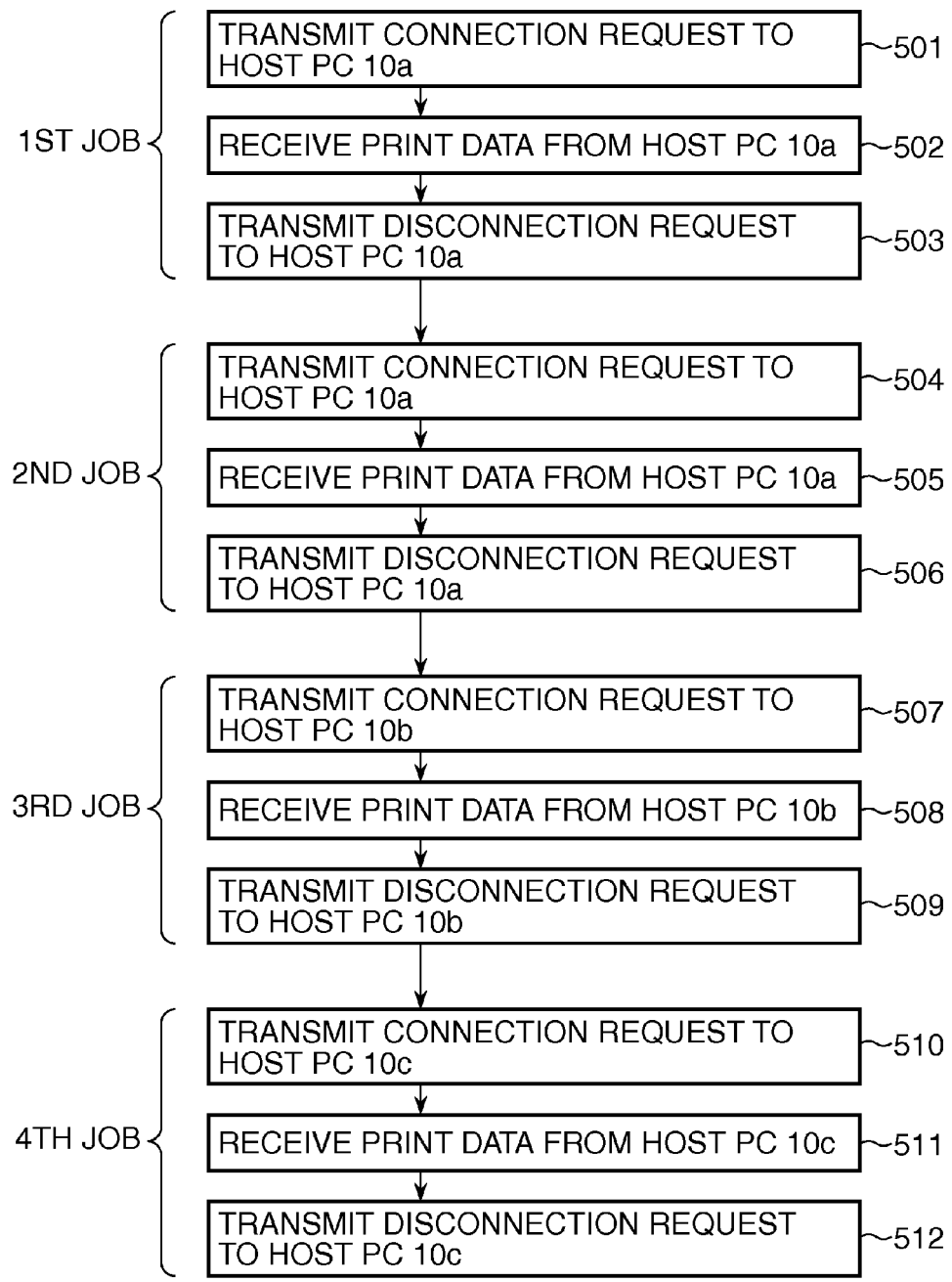
FIG. 17 is a flowchart useful in explaining a processing sequence performed by a conventional device.

FIGS. 10A and 10B are a flowchart of a job receiving and executing process performed by the image processing apparatus 20 according to the present embodiment. The job receiving and executing process shown in FIGS. 10A and 10B is executed by the CPU 803 by loading a program stored in e.g. the ROM 804 of the image processing apparatus 20 into the RAM 805. It should be noted that in the following, a description will be given of a case, by way of example, where the host IDs of the host PC 10c and the host PC 10a are registered in the priority host ID list in the priority host storage section 810 (see FIG. 12A).

In a step S1601, the CPU 803 maintains standby, and proceeds to a step S1602.

In the step S1602, the CPU 803 determines whether a beacon of a print request is received via the wireless USB antenna 102 and the wireless communication control section 808.

Then, if a beacon of a print request is received, the CPU 803 proceeds to a step S1603.

In the step S1603, the CPU 803 controls the host list control section 811 to register the host ID included in each beacon received from the host PCs in the order of receipt in a host ID list in the host list storage section 809, and then proceeds to a step S1604. FIG. 11A is a diagram showing one example of the host ID list stored in the host list storage section 809.

In the step S1604, the CPU 803 controls the host list control section 811 to determine whether or not a priority host ID list in which a priority host ID is registered in a step S1608, referred to hereinafter, is stored in the priority host storage section 810.

Then, if the priority host ID list in which a priority host ID is registered in the step S1608 is stored in the priority host storage section 810, the CPU 803 proceeds to a step S1605, whereas if the priority host ID list in which a priority host ID is registered is not stored, the CPU 803 directly proceeds to a step S1606.

In the step S1605, the CPU 803 controls the host list control section 811 to determine whether a method 1 in connection is executed according to the priority host ID list is selected or a method 2 in which connection is executed according to the host ID list is selected as a priority connection method. If the method 1 is selected, the CPU 803 proceeds to the step S1001 appearing in FIG. 4 whereas if the method 2 is selected, the CPU 803 proceeds to the step S1606. The methods 1 and 2 will be described in more detail hereinafter when referring to a step S1618.

The processing executed in the present embodiment from the step S1001 through the step S1007 appearing in FIG. 4 when the method 1 is selected in the step S605 is the same as that executed in the above-described first embodiment. In the present example, through this processing, it is assumed that the host PC 10c is connected with priority over the others, according to the priority host ID list shown in FIG. 12A, and at this time, the host ID of the host PC 10c is deleted from the priority host ID list as shown in FIG. 12B, by the host list control section 811. After termination of the processing, the CPU 803 proceeds to a step S1607

In the step S1606, the CPU 803 starts the one-to-one connection process for establishing communication with a host PC from which the beacon is received, and according to the host ID list, sends back a connection request thereto as a response via the wireless communication control section 808 and the wireless USB antenna 102. Then the CPU 803 proceeds to the step S1607. Incidentally, when a beacon of a print request to the image processing apparatus 20 is received after the communication is established, the host ID list in the host list storage section 809 is updated by the host list control section 811.

In the step S1607, the CPU 803 receives print data from the host PC 10 with which the connection is established via the wireless USB antenna 101 and the wireless communication control section 808, and then proceeds to the step S1608.

In the step S1608, the CPU 803 controls the host list control section 811 to register the host ID of the host PC 10 from which the print data is received in the priority host ID list, and then proceeds to a step S1609. Here, in the present example, as shown in FIG. 12C, the host ID of the host PC 10c is additionally registered in the priority host ID list in the priority host storage section 810.

In the step S1609, the CPU 803 performs predetermined processing on the received print data by e.g. the image processing section, not shown, outputs the processed print data to the printer 801 through the printer interface 806, and then proceeds to a step S1610.

During this job processing, if a beacon of a print request from e.g. the host PC 10a is received, the CPU 803 controls the host list control section 811 to register the host ID of the host PC 10a included in the received beacon in the host ID list in the host list storage section 809 (see FIG. 11B).

In the step S1610, the CPU 803 controls the host list control section 811 to determine whether or not there is a print request which is received from a host PC having a host ID registered in the priority host ID list, during the job processing.

Here, under the control of the CPU 803, the host list control section 811 compares the host IDs registered in the host ID list with the host IDs registered in the priority host ID list in the priority host storage section 810.

In the present example, the host ID list shown in FIG. 11B and the priority host ID list shown in FIG. 12C are compared with each other, and it is determined as a result of comparison that there is a print request received from a host PC having a host ID registered in the priority host ID list, so that the CPU 803 proceeds to a step S1611. In the comparison, the host ID of the currently connected post PC, which is added to the host ID list in the step S1608, is ignored. is determination, If there is a print request received from a host PC having a host ID registered in the priority host ID list, the CPU 803 directly proceeds to a step S1613.

In the step S1611, the CPU 803 controls the host list control section 811 to change the order of the host IDs in the host ID list stored in the host list storage section 809, and then proceeds to a step S1612.

Here, out of the host IDs registered on the host list storage section 809, a host ID that has matched in the comparison between the host ID list shown in FIG. 11B and the priority host ID list shown in FIG. 12C other than the host ID added to the priority host ID list in the step S1608 is moved to the highest priority position in the host ID list. In the present example, the host ID of the host PC 10a in the third position in the priority order of the host ID list shown in FIG. 11B is changed to the first position, whereas the host ID of the host PC 10b in the first position in the same is changed to the second position and the host ID of the host PC 10c in the second position in the same is changed to the second position, as shown in FIG. 11C.

In the step S1612, the CPU 803 controls the host list control section 811 to delete the host ID which has been moved to the highest priority position, i.e. the first position, in the host ID list in the step S1611, from the priority host ID list, and proceeds to the step S1613. In the present embodiment, the host ID of the host PC 10a is deleted from the priority host ID list, as shown in FIG. 12D.

In the step S1613, the CPU 803 determines whether or not the communication is disconnected by an abnormal condition, such as a printer error and an obstacle to wireless communication, and then proceeds to a step S1617 if the communication is disconnected (i.e. if occurrence of an error is detected), or to a step S1614 if the communication is not disconnected.

In the step S1614, the CPU 803 waits until the job transmitted from the host PC 10 is completed, and then proceeds to a step S1615.

In the step S1615, the CPU 803 controls the host list control section 811 to update the host ID list and the priority host ID list and proceeds to a step S1616. In the present example, the host ID of the currently connected host PC 10c is deleted from the host ID list and the priority host ID list (see FIG. 12E).

In the step S1616, the CPU 803 performs the process for disconnecting the communication of wireless USB connection between the image processing apparatus 20 and the host PC 10, and then proceeds to a step S1620. Here, the request for disconnecting the communication can be transmitted from either of the host PC 10 and the image processing apparatus 20.

In the step S1620, the CPU 803 enters the standby state. At this stage, in the present example, the host PC 10a and the host PC 10b remain in the host list storage section 809, and therefore in accordance with the host ID list, the CPU 803 sends back a connection request as a response sequentially to each of the corresponding host PCs to perform job processing.

On the other hand, in the step S1617, if the job is interrupted due to a disconnection of the communication caused by an abnormal condition, the CPU 803 proceeds to the step S1618.

In the step S1618, the CPU 803 controls the host list control section 811 to add priority connection method selection data 1801 (see FIG. 12A) for setting the selection of the method 1 to a priority host ID registered in the priority host ID list in the priority host storage section 810, or not to add the same for setting the selection of the method 2, according to the cause of the disconnection of the communication.

For example, if the communication is disconnected during the job processing in the step S1617, the CPU 803 causes the host list control section 811 to add the priority connection method selection data 1801 for setting the selection of the method 1 to a priority host ID registered in the priority host ID list stored in the priority host storage section 810. On the other hand, if the communication is disconnected in the step S1617 at a time other than the job processing, the CPU 803 causes the host list control section 811 not to add the priority connection method selection data 1801 to the priority host ID registered in the priority host ID list to thereby set the selection of the method 2.

The priority connection method selection data 1801 for setting the selection of the method 1 or the method 2 is checked together with the host IDs registered in the priority host ID list by the host list control section 811 in the step S1605. It should be noted that it is also possible to allow the user to set the selection of the method 1 or the method 2 through e.g. the operation unit 802.

In a step S1619, upon recovery from the abnormal condition, the CPU 803 proceeds to the step S1620 to enter the standby state.

In this case, the job is not completed normally, hence the process for deleting the host ID of the currently connected host PC 10c that is registered in the priority host ID list stored in the priority host storage section 810 is not performed as in the step S1615. Therefore, in the present embodiment, the priority host ID of the host PC 10c having been connected until the step S1613 remains to be held in the priority host ID list. Further, the priority connection method selection data 1801 is also still stored to remain (see FIG. 12D).

As described above, in the present embodiment, the priority connection process to a host PC is switched according to a cause of the disconnection of communication, whereby it is possible to efficiently perform control of the priority connection process. In other words, for example, when the communication with a host PC is disconnected after the job processing is started, if print data from other host PCs is output before a reconnection is made to the host PC with which the image processing apparatus was performing the preceding communication, there is a problem of output objects being mixed up. For this reason, if the communication is disconnected after the start of the job processing, a connection with the other host PCs is not permitted before the reconnection is made to the host PC with which the image processing apparatus was performing the preceding communication, whereby the above-mentioned problem can be avoided. On the other hand, if the communication is disconnected at a stage where the job processing is not started, the problem of output objects being mixed up does not occur, and hence a connection is permitted to the other host PCs before the reconnection is made to the host PC with which the image processing apparatus was performing the preceding communication. The other configuration and the advantageous effects are the same as those of the above-described first and second embodiments.

It should be noted that the present invention is not limited to the above-described embodiments, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-051983, filed Mar. 5, 2009, which is hereby incorporated by reference herein in its entirety.

What is claimed is:

1. An image processing apparatus capable of communicating with a plurality of host computers, comprising:
    an accepting unit configured to accept processing requests from the plurality of host computers;
    a connecting unit configured to be operable when said accepting unit accepts a processing request from any of the plurality of host computers, to connect to a host computer which is a transmission source of the accepted processing request;
    a detecting unit configured to detect occurrence of an error during communication with the host computer connected by said connecting unit; and
    a control unit configured to be operable when said detecting unit detects occurrence of an error, to control said connecting unit such that reconnection to the host computer connected at the time of occurrence of the error is given priority over connection to another host computer.

2. The image processing apparatus according to claim 1, wherein said image processing apparatus is capable of executing wireless USB communication with one host computer out of the plurality of host computers that is connected by said connecting unit.

3. The image processing apparatus according to claim 1, wherein the control unit is configured to be operable when said detecting unit detects occurrence of an error, to control said connecting unit so as not to connect to other host computers before said connecting unit reconnects to the host computer connected at the time of occurrence of the error.

4. The image processing apparatus according to claim 3, wherein said control unit is configured to be operable when said detecting unit detects occurrence of an error, to control said connecting unit such that even if said accepting unit accepts a processing request from another host computer, said connecting unit does not connect to the other host computer before said connecting unit reconnects to the host computer connected at the time of occurrence of the error, and only after communication with the host computer connected at the time of occurrence of the error is terminated normally, said connecting unit connects to the other host computer.

5. The image processing apparatus according to claim 4, wherein said control unit is configured to be operable when said detecting unit detects occurrence of an error, to control said connecting unit such that if a processing request from the host computer connected at the time of occurrence of the error is not accepted by said accepting unit before a predetermined time period elapses, said connecting unit connects to the other host computer whose processing request is accepted by said accepting unit.

6. The image processing apparatus according to claim 1, further comprising a setting unit configured to be operable when said detecting unit detects occurrence of an error, to make either a setting of inhibiting connection to any other host computer until the host computer connected at the time of occurrence of the error is reconnected, or a setting of permitting connection to another host computer regardless of whether or not the host computer connected at the time of occurrence of the error is reconnected, and
    wherein said control unit is configured to be operable when said detecting unit detects occurrence of an error, to control said connecting unit in accordance with the setting made by said setting unit.

7. The image processing apparatus according to claim 1, wherein said control unit is configured to be operable when said detecting unit detects occurrence of an error, to control said connecting unit, if thereafter, said accepting unit accepts a print request from the host computer connected at the time of occurrence of the error, such that said connecting unit connects to the host computer connected at the time of occurrence of the error before said connecting unit connects to a host computer which is a transmission source of a print request that is accepted prior to the accepted print request from the host computer connected at the time of occurrence of the error.

8. The image processing apparatus according to claim 7, wherein said control unit is configured to be operable when said detecting unit detects occurrence of an error, to control said connecting unit, if a print request from the host computer connected at the time of occurrence of the error is accepted in a state having accepted print requests from a plurality of host computers including a currently connected host computer that is newly connected after the detection of the error, such that only after communication with the currently connected host computer is terminated normally, said connecting unit connects to the host computer connected at the time of occurrence of the error before said connecting unit connects to a host computer which is a transmission source of a print request that is accepted prior to the print request from the host computer connected at the time of occurrence of the error.

9. The image processing apparatus according to claim 1, further comprising a printing unit configured to receive print data from a host computer connected by said connecting unit, and execute a printing process based on the received print data.

10. A method of controlling an image processing apparatus capable of communicating with a plurality of host computers, comprising:
    accepting processing requests from the plurality of host computers;
    connecting, when said accepting accepts a processing request from any of the plurality of host computers, to a host computer which is a transmission source of the accepted processing request;
    detecting occurrence of an error during communication with the host computer connected by said connecting unit; and
    controlling said connecting, when said detecting detects occurrence of an error, such that reconnection to the host computer connected at the time of occurrence of the error is given priority over connection to another host computer.

11. A non-transitory computer-readable storage medium which stores a program for causing a computer to control an image processing apparatus capable of communicating with a plurality of host computers,
    wherein the program comprises:
    accepting instructions configured to accept processing requests from the plurality of host computers;
    connecting instructions configured to connect, when a processing request from any of the plurality of host computers is accepted according to said accepting instructions, to a host computer which is a transmission source of the accepted processing request;

detecting instructions configured to detect occurrence of an error during communication with the host computer connected according to said connecting instructions; and controlling instructions configured to control said connecting instructions, when occurrence of an error is detected according to said detecting instructions, such that reconnection to the host computer connected at the time of occurrence of the error is given priority over connection to another host computer.

\* \* \* \* \*